Patented Nov. 20, 1928.

1,691,960

UNITED STATES PATENT OFFICE.

SYLVAIN COULIER, OF BRUSSELS, BELGIUM.

MANUFACTURE OF ALKALINE CYANIDES.

No Drawing. Application filed February 18, 1926, Serial No. 89,234, and in Belgium February 24, 1925.

This invention relates to an improved process for the manufacture of alkali-metal cyanides, in which free or combined nitrogen is caused to act at a high temperature upon a mixture of carbon and one or more compounds of an alkali metal the cyanide of which is to be produced.

Such a process is generally characterized by the use of an alkali carbonate mixed with carbonaceous substances. The resultant mixture may be heated to a high temperature, and the re-acting nitrogen may be derived from an air blast to which, moreover, ammonia may be added if desired.

The invention aims at utilizing nitrogenous organic matter in a better way, and at producing alkali cyanides, starting from the said matter, in addition to other valuable products such as glycerine, fatty acids, acetone, methyl alcohol, amines, ammonia, etc., which hitherto have been obtained by the destructive distillation of the said matter.

The term "nitrogenous organic matter", is intended to cover any natural and residuary animal and vegetable matter adapted to be employed either as nitrogenous food for animals, or as nitrogenous fertilizers, or for the preparation of ferro-cyanides by the old method consisting in melting a mixture of these materials with alkalies in iron retorts. Such materials are, for example: animal fat and waste, seaweed, pulp, bark and stones or kernals of alimentary plants and fruits; molasses and liquors derived from sugar works and distilleries; the residues from the treatment of hides, leather, bones, wool, feathers and hair; water and sludge from sewerages; and worn materials, such as old leather, boots and shoes, exhausted tanning materials. All these substantially-nitrogenous organic materials are mixed with alkalies or alkali carbonates unless they already contain them; and the mixtures of these materials with alkalies or alkali carbonates or only the constituents of the materials soluble in the latter are employed for the manufacture of alkali cyanides.

The present invention relates to a process of manufacturing alkali-metal cyanides which comprises the steps of distilling nitrogenous organic materials and then subjecting the distillation residue to the cyaniding action, at a temperature of between 800 and 1000° C. of the elemental nitrogen or the nitrogen compounds liberated in the course of distillation.

The cyaniding process may be carried out with the aid of known means and in any known apparatus used for the purpose. The alkaline carbonaceous residue is preferably crushed and sifted and the nitrogen gases may be used at ordinary or higher pressure.

When the process is applied to the utilization of organic nitrogenous matter containing sulphur, for example, in the form of alkaline sulphates, the invention contemplates the use of suitable desulphurizing agents such, for example, as alkaline earth oxides or carbonates, metals such as iron and manganese or their oxides, and, in general, all metals or compounds of metals capable of fixing sulphur in the state of sulphide. A desulphurizing agent which may be employed is calcium carbonate, a residual product from the manufacture of sugar which is derived from the carbonization or saturation of the limed juice by carbon dioxide.

When the process of the invention is to be applied to nitrogenous organic matter such as, for example, vinasses derived from molasses and containing free sulphuric acid causing an acid reaction, the said acid may be neutralized by the addition of one or more of the above-mentioned substances before proceding with destructive distillation for obtaining the material to be cyanided. These additions are always proportional to the percentage of acids or of sulphates in the organic nitrogenous material utilized.

The alkaline carbonaceous residue to be cyanided is preferably derived from very low temperature distillation of nitrogenous organic matter with alkali, and it generally retains a notable proportion of the nitrogen of the material treated. According to the invention this residue is subjected to the action of heat in an autoclave before the free or combined nitrogen of the gases of distillation is caused to act on it. To this end, the residue is introduced into the autoclave, which is heated to a temperature of from 800 to 1000° C., and thereafter the nitrogen is likewise introduced. The effect of this temperature, which is much higher than that of distillation, is to produce a more complete liberation of gas, so that the pressure in the autoclave rises and can reach several atmospheres.

The alkali residue, already partially cyanided by this treatment, can then be subjected to the action of the gases of distillation, or simply that of the nitrogenous gases separated therefrom, as explained above. The cooled material is thereafter crushed and delivered to the cyaniding apparatus proper which may if necessary be the same as those used for distillation. All the operations: distillation, autoclave heating and heating with admission of distillation gases, can take place in one and the same apparatus or in different apparatus.

*Example 1.*—Old leather, leather scrap and tannery refuse are suitably mixed with sodium carbonate and subjected to dry distillation in retorts gradually heated to 350–450° C. preferably under reduced pressure. Distillation begins at about 100° C., and yields combustible gases, an ammoniacal liquid, an oil and sometimes also tar. The distillation residue is an alkaline carbonaceous residue containing iron and copper from the old leather and perhaps chromium oxide if the leather was tanned with chromium. These metals and this oxide are very useful as catalyzers in cyaniding the alkali residue by means of nitrogen obtained from non-condensing gases evolved during distillation, after combustion of said gases and separation of carbonic acid. The alkaline residue, heated to 800 to 1000° C. in the presence of elemental nitrogen, yields a cyanided material mainly containing sodium cyanide and carbon.

*Example 2.*—Slaughterhouse offals are digested in an autoclave boiler in a concentrated solution of caustic soda or caustic potash heated to a maximum temperature of 200° C. The resulting pulp (a mixture of nitrogenous and non-nitrogenous organic materials and alkali) is thereafter gradually distilled under reduced pressure, first to 200–220° C. for extracting glycerine, then up to 300–400° C. The vapours evolved are condensed, for the recovery of more glycerine, ammoniacal compounds and oils. The liquid from condensation is decanted and treated in the usual way for disengaging ammonia which is then led over the residue of distillation, heated to 800–1000° C. for transforming the alkali into cyanide.

*Example 3.*—Vinasse from sugar-beet molasses is concentrated under the addition of carbon, sawdust, damaged pulp or any carbonaceous material, and a sufficient proportion of pulverized iron or iron oxide, for fixing the amount of sulphur when alkali metal sulphates are reduced by carbon, and if necessary for acting as a catalyzer. The mixture is supplied to a retort heated to between 300° to 500° C. in which it is distilled in the known manner under ordinary or moderate pressure. Distillation yields combustible gases, a condensation liquid containing ammoniacal and amino compounds, oils and tar, and an alkali carbon residue retaining nitrogen. This alkali carbon residue is raised to a higher temperature (800° to 1000° C.) in a closed vessel or under pressure of nitrogen obtained from the non-condensable and nitrogen-bearing gas stage of distillation. However, and preferably, these gases are burnt first and carbonic anhydride is separated therefrom in the known way. The aqueous portion of the condensation liquid obtained in distillation is decanted and thereafter acidified by sulphuric acid. It is then first distilled in view of recovering fatty acids and methyl alcohol, and thereafter evaporated and concentrated. Crystallized ammonium sulphate is recovered by cooling while the mother liquor, treated with lime and distilled, yields trimethylamine which is passed over the distillation residue already partially cyanided and heated to 800° C. to 1000° C.

*Example 4.*—Lime is added to de-sugared molasses in sufficient proportion to decompose the salts of fatty acids and the amino and ammonia compounds. The thick mixture is subjected to destructive distillation in a closed vessel at moderate pressure and at a temperature gradually rising to 300–400° C. Ammonia, amines, acetic acid, methyl alcohol, light oils and tars are recovered in the customary way. The aqueous portion of the liquid of condensation is distilled with milk of lime which retains fatty acids while methyl alcohol, ammonia and trimethylamine are freed. Ammonia and the amines are absorbed by sulphuric acid, ammonia being separated by crystallization of ammonia sulphate. The mother liquor is distilled with lime and trimethylamine is utilized for cyaniding the alkaline carbonaceous matter (residue of distillation) heated to 800° C. to 1000° C. and if necessary previously and partially cyanided in a closed vessel or under nitrogen pressure, as in the preceding example.

*Example 5.*—Vinasse derived from molasses and previously concentrated and with the addition of a desulphurizing agent capable of forming a catalyzer in the residue, is subjected to gradual distillation in a vacuum, with agitation and steam injection, first at a temperature between 200° C. and 300° C for the recovery of glycerine, then at a temperature gradually raised to 550° C. for the recovery of light tars, acetic acid, etc., and amino compounds, ammonia and combustible gases containing elemental nitrogen. The whole of the nitrogenous compounds or elemental nitrogen only are then caused to act, as in the preceding examples, on the distillation residue heated to a temperature suitable for the preparation of alkali metal cyanide.

In each case, it is advisable to cause the gas least rich in nitrogen to act upon fresh residue and to cause the gases richest in nitrogen to act upon partially cyanided residue.

In a similar manner, and with respect to vinasses and other nitrogenous organic matter, it may be desirable to collect most of the mythyl group (CH$_3$) first and to use for cyaniding purposes, with preliminary dissociation, only the gases evolved at destruction heat, the latter varying with the nature and composition of the organic nitrogenous matter treated, but being generally between 200 and 300° C. Destructive distillation may be also carried out at a temperature not exceeding the latter or remaining in the vicinity thereof. In each case the residual material derived from distillation may be subjected to a partial and preliminary cyaniding process by residual nitrogen retained in the alkaline carbonaceous material, and carried out under pressure in a closed vessel.

As previously stated the nitrogenous organic matter submitted to destructive distillation may receive an addition of carbonaceous material if it is too rich in alkalies, or an addition of alkaline compounds if it is too rich in carbon. These possible additions, like that of a catalyzer such as comminuted iron, iron oxide, halogen salts, etc.; are preferably made before the nitrogenous organic matter is subjected to distillation. These additions however may be made at any other stage of the process, in particular immediately before the residue of destructive distillation is preliminarily or finally cyanided.

The organic matter concerned may be subjected to destructive distillation according to any known method and in any known apparatus. The said distillation may be advantageously carried out by agitating the material while it is distilled in order to obtain a divided saline residue which may be used straightaway for cyaniding, i. e. without requiring to be crushed.

When the cyaniding operation of the residual material is completed, the said material may be crushed and exhausted with water for separating alkali metal cyanide from insoluble substances which with an excess of carbon contain sometimes the desulphurizing agent (as a sulphide) added before distillation, and the catalyzer. The latter residual material may be subjected to a further treatment for separating the catalyzer and the carbon which may be used for de-colouring purposes or if necessary or desirable may be added together with the catalyzer to the organic nitrogenous matter before it is distilled for the purpose of obtaining the correct proportion of carbon, catalyzer and alkali metal compounds used in the process for cyaniding the residue from distillation.

The cyanided material may also be utilized to produce ammonia in the known way, under recovery of alkali metal formates.

What I claim as my invention and desire to secure by Letters Patent is:

1. In a process of making alkali metal cyanides, the steps of distilling nitrogenous organic matter; separating the relatively non-volatile, non-nitrogenous substances from the rest of the distillate; and causing the elemental nitrogen liberated in the course of distillation to act, at a temperature between 800–1000° C., upon the residue of distillation to effect cyanidation; the distillation step being carried out at a temperature considerably below that of the cyaniding step.

2. In a process of making alkali metal cyanides, the steps of distilling nitrogenous organic matter; separating the relatively non-volatile, non-nitrogenous substances from the rest of the distillate; and causing the elemental nitrogen and nitrogen compounds liberated in the course of distillation to act, at a temperature between 800–1000° C., upon the residue of distillation to effect cyanidation; the distillation step being carried out at a temperature considerably below that of the cyaniding step.

3. In a process of making alkali metal cyanides, the steps of distilling nitrogenous organic matter; separating the relatively non-volatile, non-nitrogenous substances from the rest of the distillate; and causing the elemental nitrogen and the amines liberated in the course of distillation to act, at a temperature between 800–1000° C., upon the residue of distillation to effect cyanidation; the distillation step being carried out at a temperature considerably below that of the cyaniding step.

4. In a process of making alkali metal cyanides, the steps of distilling nitrogenous organic matter; separating tars and water from the gaseous products of such distillation; and then causing the tar-free and water-free nitrogenous gaseous products to act, at a temperature between 800–1000° C., upon the residue of distillation to effect cyanidation; the distillation step being carried out at a temperature considerably below that of the cyaniding step.

5. In a process of making alkali metal cyanides, the steps of distilling nitrogenous organic matter; separating the relatively non-volatile, non-nitrogenous substances from the rest of the distillate; introducing into a closed vessel the residue of distillation; heating said residue to a temperature between 800–1000° C. to fix the residual nitrogen of the residue; and introducing the gaseous nitrogenous products of distillation into said vessel to act on the nitrified residue; the distillation step being carried out at a temperature considerably below that of the cyaniding step.

6. In a process of making alkali metal cyanides, the steps of distilling nitrogenous organic matter; separating the relatively non-volatile, non-nitrogenous substances from the rest of the distillate; heating the residue of distillation to a temperature between 800–1000° C.; then causing the gaseous nitrogenous products of distillation to act on the heated residue; cooling and crushing the partially-cyanided material obtained; and then effecting complete cyanidation of said material; the distillation step being carried out at a temperature considerably below that of the cyaniding step.

In testimony whereof I affix my signature.

SYLVAIN COULIER.